W. A. HOETH.
APPARATUS FOR TREATING MILK.
APPLICATION FILED JULY 12, 1915.
1,249,089.
Patented Dec. 4, 1917.
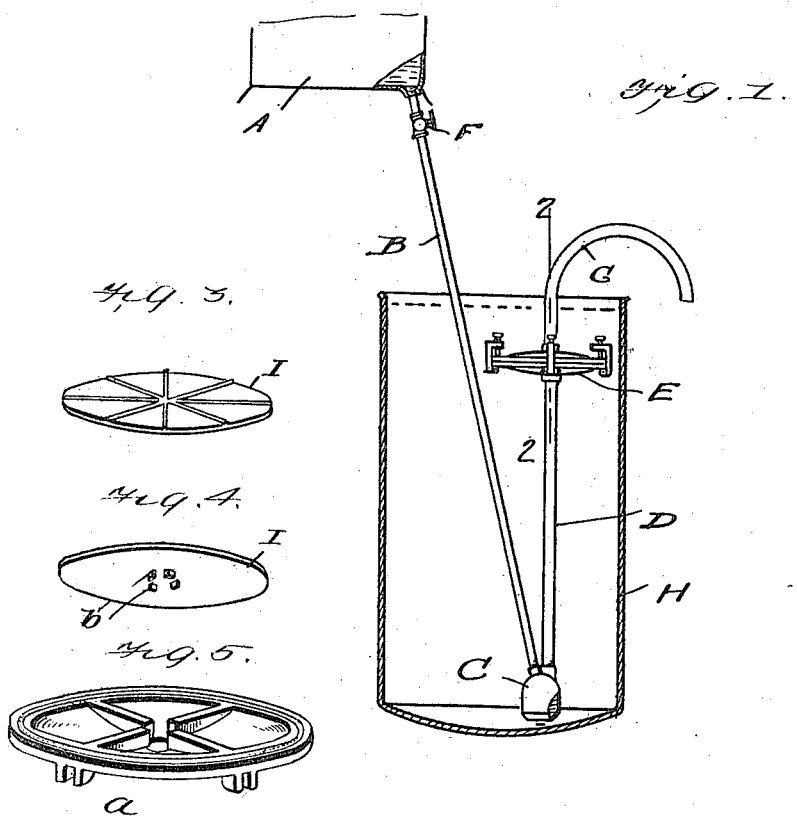
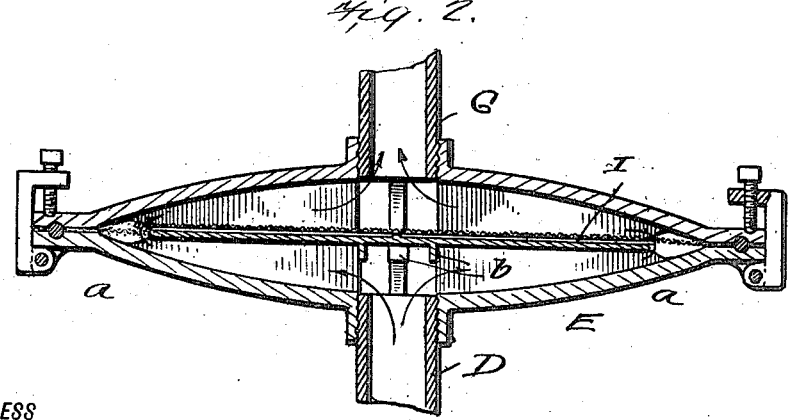
WITNESS
F. C. Barry
INVENTOR
William A. Hoeth
BY
ATTORNEYS

UNITED STATES PATENT OFFICE.

WILLIAM A. HOETH, OF GREENFIELD, WISCONSIN.

APPARATUS FOR TREATING MILK.

1,249,089.   Specification of Letters Patent.   Patented Dec. 4, 1917.

Application filed July 12, 1915. Serial No. 39,292.

*To all whom it may concern:*

Be it known that I, WILLIAM A. HOETH, a citizen of the United States, and a resident of Greenfield, in the county of La Crosse and State of Wisconsin, have made an Improved Apparatus for Treating Milk, of which the following is a specification.

My invention is an improved apparatus for treating milk as it comes from the cow, by which it is strained and raised or lowered to any desired temperature. The latter is varied according to the use for which the milk is required. If it is to be bottled and marketed, the degree of temperature sought will be much lower than if it is to be passed through a separator to prepare it for delivery to creameries.

The apparatus is so constructed that the milk may be brought to any desired temperature at the same time it is being strained, and then passed on out of the apparatus either strained and cooled ready for use, or warm ready for passing through the cream separator, this all being accomplished at one operation.

The details of construction and operation of the apparatus are as hereinafter described and illustrated in the accompanying drawing in which:—

Figure 1 is a side elevation of the entire apparatus, portions being in section to illustrate the interior construction.

Fig. 2 is a section on the line 2—2 of Fig. 1, taken through the strainer.

Fig 3 is a detail perspective of the metal disk forming part of the strainer.

Fig 4 is an inverted perspective of the same showing lugs.

Fig 5 is a perspective view of the lower concave plate.

Referring particularly to Fig. 1, A indicates a receiving tank into which the milk is poured as brought from the cow, the said tank being supported upon a pedestal at a sufficient height to create sufficient pressure to cause the milk to flow downwardly into the pipe B, and bulb C and rise in the pipe D, passing through the strainer E and out through the gravity pipe G. The pipes B and D are screw-threaded at their ends, and thus adapted for connection with the tank A and the bulb C. The pipe B is provided at the top with a stop cock F, by which the flow of milk from the tank A may be cut off whenever desired, particularly when it is required to remove the bulb C for cleaning the same.

The pipe D leading upward from the bulb C has a greater diameter than the pipe B, so that the speed of the upward flow of milk from the pipe D as it rises and passes through the strainer E is reduced, which allows sediment to settle and descend in the pipe D into the bulb C, to a greater degree than would result if the two pipes B and D were of like diameter.

The bulb C is constructed of metal, preferably of aluminum, its purpose being to not only connect the two pipes B and D but to furnish a receptacle for sediment or foreign particles that may be contained in the milk, and which the slower current of milk in the pipe D allows to naturally settle to the bottom by the effect of gravity.

The pipes B, D, bulb C, and strainer E are arranged in a tank H, and immersed in water contained therein, whose temperature is raised or cooled to any desired degree according to the use for which the strained milk is to be used. In other words, the water in the tank H regulates the temperature of the milk.

The strainer E is constructed and operates as follows: It is circular in shape and formed in part of two concavo-convex metal plates having central openings, the pipe D being inserted in the center of the lower plate, and the delivery or outflow pipe G being similarly attached to the upper one.

The milk as it flows from the upper surface of the sheet metal disk I ascends through the straining cloths into the pipe G, leaving below any sediment that may have been contained in the milk. The purpose of the sheet metal disk I is to compel the flow of the milk as it rises into the strainer from the pipe D to pass outwardly to the extreme outer edge of the circular strainer, and then to pass through the straining cloths to the discharge pipe G. A rubber ring is fitted in coincident grooves between the parallel flanges of the upper and lower plates, so that no milk may exude from the strainer between these two plates, and no water get in. The strainer cloths to be used must lie upon the ribs on the upper surface of the metal disk I, and extend across the entire diameter of the strainer and be held in position by the pressure of the circular edges of the plates as they are fastened together when the machine is in operation.

The two plates of the strainer E are held in place by thumb screws or like devices, which may be quickly and easily operated.

In Fig. 2 $a$ indicates a lower plate with hinged thumb screws for clamping the two plates together; Fig. 4 shows the metallic disk I with lugs $b$ for holding it in place on the inner surface of the lower plate of the strainer E.

I claim:—

1. In an apparatus for the purpose specified, the combination with an outflow pipe, of the improved strainer comprising concave metal plates having radial ribs on their inner adjacent sides, a metal disk interposed between the plates, and strainer cloths supported by said disk, and pipes connected with the respective plates at their centers, as described.

2. The improved strainer comprising concavo-convex plates opposed to each other and having coincident central openings, the inner concave surfaces provided with ribs extending radially from the openings, a disk extending horizontally between the said plates and having radial ribs on its upper side, and lugs pendent from its central portion and abutting the inner ends of the ribs of the lower plate, and a straining cloth supported on the ribbed upper plate, as described.

In testimony whereof I have signed my name to this specification in the presence of two subscribing witnesses.

WM. A. HOETH.

Witnesses:
MARIE PEIKERT,
H. S. BURROUGHS.

Copies of this patent may be obtained for five cents each, by addressing the "Commissioner of Patents, Washington, D. C."